July 15, 1958 C. KOSTKA 2,842,998
STEADYING REST FOR METAL LATHES
Filed Nov. 13, 1953 3 Sheets-Sheet 1
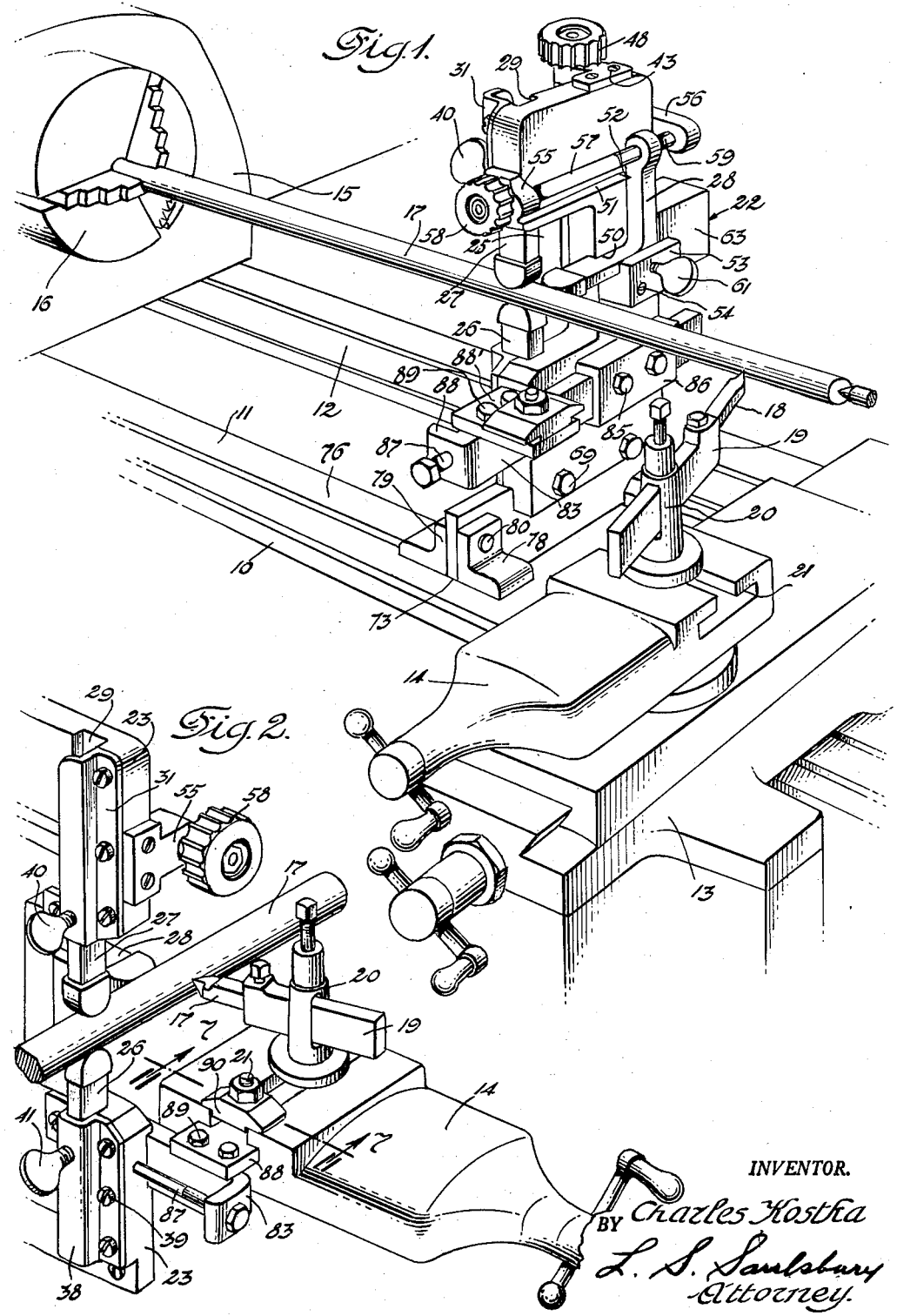
INVENTOR.
BY Charles Kostka
L. S. Saulsbury
Attorney.

July 15, 1958 — C. KOSTKA — 2,842,998
STEADYING REST FOR METAL LATHES
Filed Nov. 13, 1953 — 3 Sheets-Sheet 2
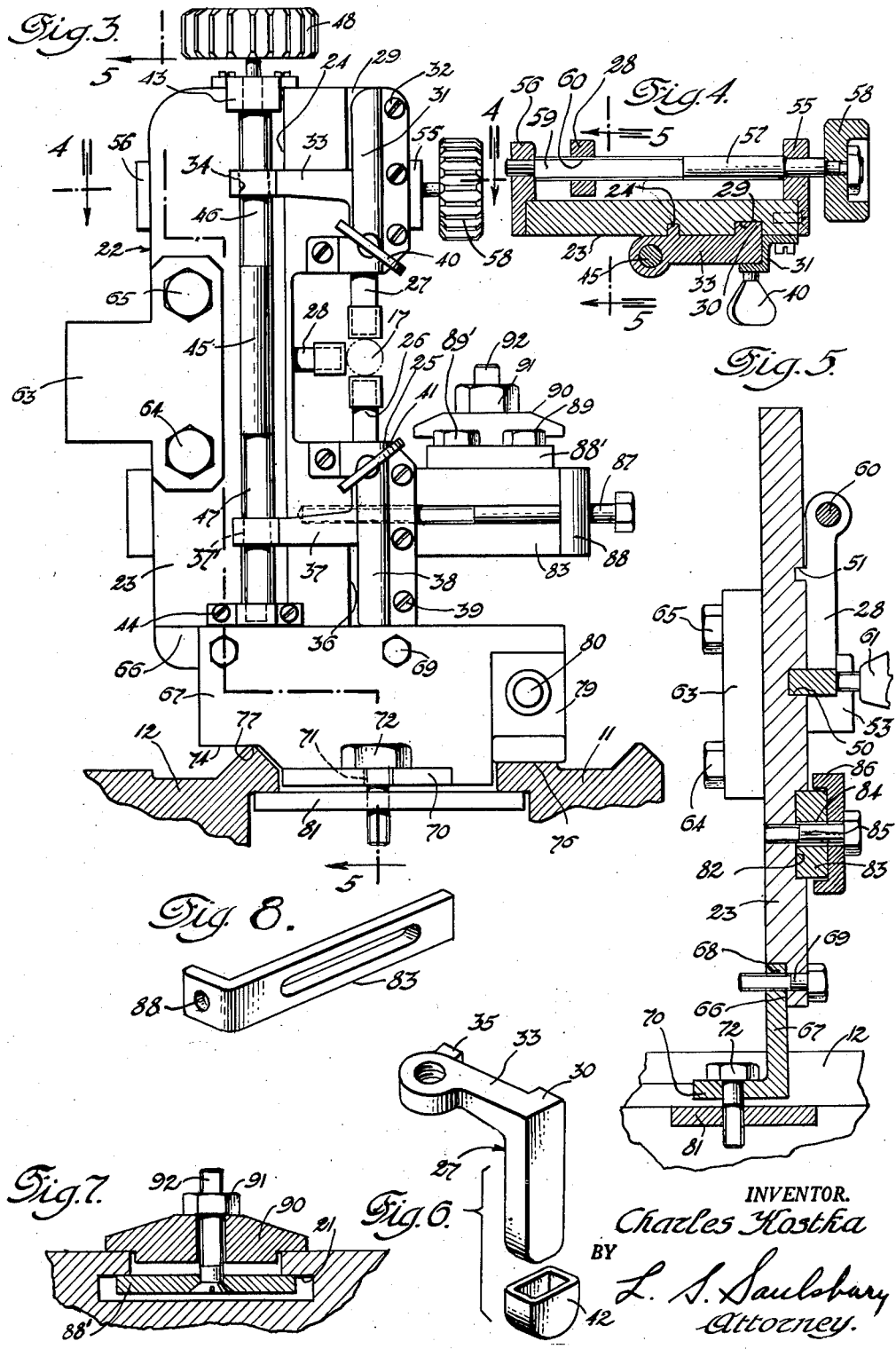
INVENTOR.
Charles Kostka
BY
L. A. Saulsbury
Attorney.

July 15, 1958  C. KOSTKA  2,842,998
STEADYING REST FOR METAL LATHES
Filed Nov. 13, 1953  3 Sheets-Sheet 3
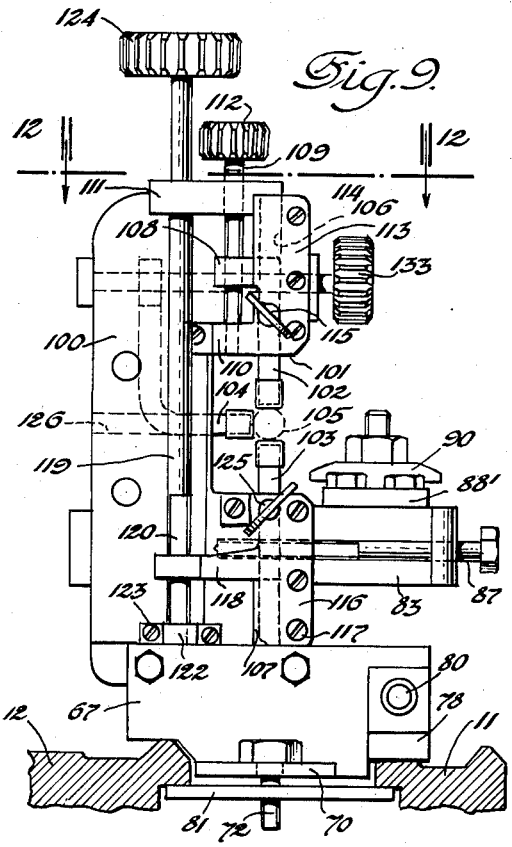
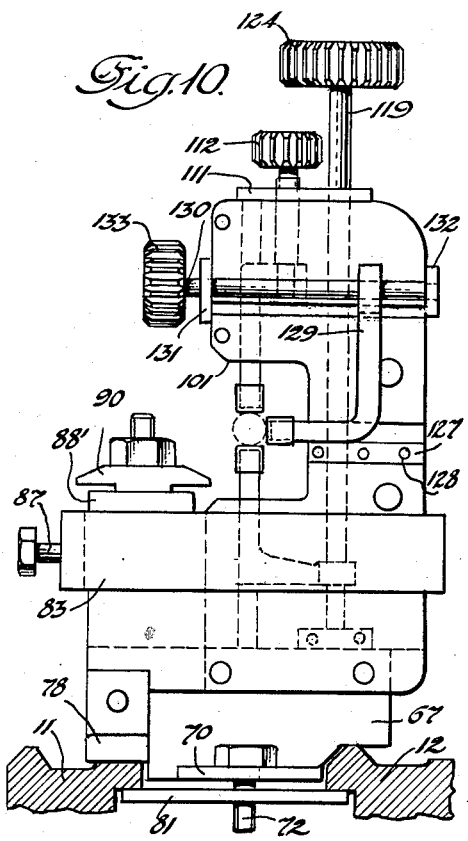
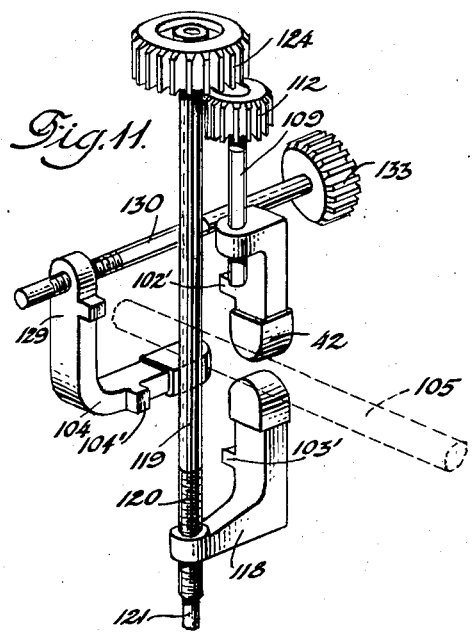
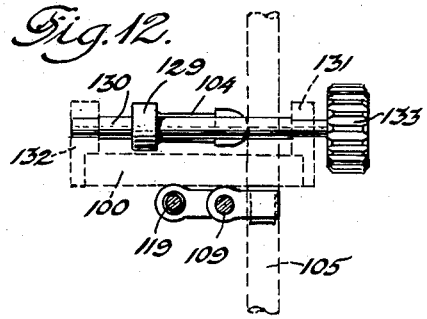
INVENTOR.
Charles Kostka
BY
L. S. Saulsbury
Attorney.

United States Patent Office 2,842,998
Patented July 15, 1958

2,842,998

STEADYING REST FOR METAL LATHES

Charles Kostka, Bronx, N. Y.

Application November 13, 1953, Serial No. 392,137

1 Claim. (Cl. 82—39)

This invention relates to a steadying and follower rest for metal lathes.

It is an object of the present invention to provide a steadying or follower rest for metal lathes through which the bar stock is extended and is supported while being rotated by the drive chuck of the lathe and worked upon by a cutting tool, the steadying rest being adapted to be either attached to the lathe bed or to the T-slot in the compound rest assembly on the carriage so as to move with the cutting tool or bit.

It is another object to provide a steadying or follower rest for metal lathes wherein the work engaging members or fingers engage the work from three sides—top, bottom, and back—so as to leave the front open at all times to permit the easy insertion or removal of the work piece without loosening the setting of the fingers and facilitate production.

It is another object of the invention to provide a steadying rest which has an angling clamp support that is so formed and attached rigidly to the rest that the rest can be quickly and rigidly installed upon the lathe bed and converted from a follower rest to a steadying rest or vice versa.

It is another object of the invention to provide a steadying rest for lathes wherein the adjusting screws are easily available upon the top and front parts of the rest to raise and lower top and bottom work engaging members and to adjust the back engaging member, the hand knobs of the adjusting screws being at the top and at the front of the rest and thereby easily accessible.

It is another object of the invention to provide with a steadying or follower rest for metal lathes a special clamping arrangement for engagement with the T-slot of the compound rest of the tool carriage so that the steadying rest can follow the carriage and move with the cutting tool and wherein the work engaging members of the rest are supported upon the clamping arrangement connected to the carriage for relative adjustment with respect to the carriage in order that once the steadying rest has been fixed upon the tool carriage, its work engaging members can be brought in unison to the work and thereby makes easy the centralizing of the rest upon the work as required from time to time.

It is a still further object of the invention to provide a steadying rest wherein the work-engaging or steadying members are so shaped that they can be made to accommodate soft material by merely slipping on small brass or copper end or tip clips for engagement with the soft work piece.

Other objects of the invention are to provide a steadying or follower rest for metal lathes, having the above objects in mind, which is of simple construction, inexpensive to manufacture, has a minimum number of parts, easily and quickly installed upon the lathe, easy to adjust, compact, rugged and durable, convenient to use and efficient in operation.

For other objects and a better understanding of the invention, reference may be had to the following detailed description taken in connection with the accompanying drawing, in which:

Figure 1 is a perspective view of the steadying rest as it is mounted upon a lathe bed and supporting a bar stock piece driven by the lathe chuck and of the tool carriage with the cutting tool thereon engaging with the bar piece;

Fig. 2 is a fragmentary perspective view of the rest shown in Fig. 1, with the T-slot attachment securing the steadying rest in the T-slot on the tool carriage to move therewith and for use as a follower rest;

Fig. 3 is a side elevational view of the steadying rest and showing the manner that the angling clamp support is fixed to the rest and to the lathe bed;

Fig. 4 is a transverse sectional view of the steadying rest taken on line 4—4 of Fig. 3;

Fig. 5 is a vertical sectional view of the steadying rest taken on line 5—5 of Fig. 4;

Fig. 6 is a collective and perspective view of the back steadying member or finger and of a brass or copper tip cup engageable therewith for steadying soft work;

Fig. 7 is an enlarged transverse sectional view taken generally on line 7—7 of Fig. 2 and through the T-slot clamp members fixing the rest to the T-slot of the compound rest on the tool carriage;

Fig. 8 is a perspective view of the slide support that is fixed by the T-slot clamping members to the compound rest and relative to which the steadying rest is adjusted to centralize the rest upon the work;

Fig. 9 is an elevational view of a modified form of the invention wherein the upper and lower work engaging fingers are adjusted by separate turning screws, the turning knobs for both fingers being on the upper portion of the rest adjacent one another and adjacent to the adjusting screw knob for the back finger;

Fig. 10 is an elevational view of the steadying rest shown in Fig. 9 but looking upon the opposite side thereof;

Fig. 11 is a skeletonized perspective view of the work engaging fingers and the adjusting screws for operating the same, fingers and adjusting screws being removed from the vertically extending plate support; and Fig. 12 is a fragmentary and skeletonized view taken generally on line 12—12 of Fig. 9.

Referring now to the figures, 10 represents a lathe bed having guideways 11 and 12 over which a tool carriage 13 having a compound rest 14 is adjustable in the conventional manner either by hand or self-fed by the lathe. On one end of the lathe is a head 15 having a chuck 16 from which a bar stock piece 17 extends for engagement by a cutting tool 18 held by a tool holder 19 in a tool post 20 fixed to a T-slot 21 of the compound rest 14 in the conventional manner. The bar stock piece 17 is driven by the chuck 15, and in order to keep the same in engagement with the cutting tool 18 there has been provided the present steadying rest indicated generally at 22.

As shown in Figs. 1 and 3, the steadying rest 22 is mounted upon the lathe bed 11. This steadying rest 22 comprises a vertically extending plate 23 having a vertically extending guideway and a recess 25 intermediate its height through which the work piece 17 extends and into which work engaging steadying members or fingers 26, 27 and 28 are extended for engagement with the work piece 17. Above the recess 25 is a vertically extending groove 29 that receives side edge 30 of work engaging member 27, Fig. 6, and in which the member 27 can be adjusted for engagement with the work piece 17 from above. A retaining plate 31 is secured by screws 32 over the member 27 to hold the same in the groove 29. The work engaging member 27 has a laterally extending arm 33 with a threaded opening 34 on its end, Fig. 6, and a guide projection or pin 35 that is adjustable in the vertically extending guideway 24.

In the plate 23 below the recess 25 is a lower vertically extending groove 36 into which there extends a side edge of the work engaging member 26 to guide the vertical adjusting movement of the member 26. The member 26 has a laterally extending arm 37 similar to the arm 33 of the member 27 and on the end of which there is a threaded opening 37' and as pin projection to slide in guideway 24. The work engaging member 26 is held in place within the groove 36 by a retaining plate 38 fastened to the face of the plate 23 by screws 39.

On the retaining plate 31 for the upper work engaging member 27 is a quick tightening and releasing thumb screw 40 for locking the member 27 in its adjusted position. A similar thumb screw 41 is provided in the lower retaining member 38 whereby to lock the lower work engaging member 26 in its adjusted position. A head cup or cap 42 of soft metal, such as brass or copper, can be placed on the ends of the work engaging members as shown in Figs. 1, 3 and 6, when engaging a work piece of soft metal.

Fixed to the upper and lower portions of the vertically extending plate 23 are respectively top and bottom bearing members 43 and 44 in which a vertically extending adjusting screw 45 is journalled. This adjusting screw has at the upper and lower portions thereof respectively reverse threads 46 and 47, and these threads engage respectively with the threaded openings 34 and 37' of the respective upper and lower work engaging members 27 and 26. The adjusting shaft 45 has a knob 48 thereon for turning the same that is accessible from the top of the rest 22.

On the back of the plate 23 are parallel horizontal grooves 50 and 51. The side edge of the back finger or member 28 slides in the groove 51. A retaining member 53 fixed to the side of the plate by screws 54 holds the finger or member 28 in the grooves 50 and 51. On the opposite edges of the plate 23 are respectively bearing brackets 55 and 56 in which is journalled a transversely extending adjusting screw 57 having a turning knob 58 and a threaded portion 59 extending through a threaded opening 60 in the work engaging finger member 28. A quick tightening and releasing thumb screw 61 in the retainer 32 will hold the finger member 28 rigidly in its adjusted position.

On the rear edge of the plate 23 there is fixed a large block 63 by means of bolts 64 and 65. This block projects from the edge of the plate 23 and can be placed in a jaw vise on the lathe in a co-pending application filed simultaneously herewith.

As shown in Figs. 1, 3 and 5, the plate 23 is cut away on its lower edge as indicated at 66 and within which there is fixed a depending clamping plate 67. The plate 67 has threaded openings 68 to which attaching screws 69 are respectively connected to secure the plate 67 to the lower edge of the plate 23. On the lower end of the clamp member 67 is a horizontal portion 70 having an opening 71 through which a clamping bolt 72 extends. The plate 67 is recessed at 73 and 74 to lie upon upper edges 76 and 77 of the respective guideways 11 and 12 of the lathe so that the horizontal portion will extend therebelow. To give adequate support for the rest while the same is being attached to the lathe bed, angle members 78 and 79 are secured to the opposite faces of the clamping plate 67 so that their respective horizontal portions lie flush upon the edge surface 76 of the lathe bed. Pin and rivet means 80 fix these angle members 78 and 79 to the clamping plate 67.

A bottom clamping plate 81 is turned so that its ends lie under the edges 76 and 77 of the lathe bed. These edges are cut away to provide under shoulders and upon tightening the bolt 72, clamping plate 81 is brought against the shoulder so that the steadying rest is easily, quickly and rigidly installed upon the lathe bed.

On the rear face of the plate 23 is a large groove 82 along which extends a slide support 83, Fig. 9, having an elongated slot 84 through which clamping bolts 85 extend for the securement of the slide support 83 in its adjusted position upon the plate 23. A channel-shaped clamping member 86 extends over the slide support and the bolts 85 fix the plate 23 against the slide whereby to hold the plate 23 against adjustment upon the slide support 83. Upon the clamping bolts 85 being loosened, an adjusting screw 87 extending through a bent or angled portion 88 of the slide support 83 is threaded into the front edge of the plate 23. This bolt or screw 87 serves as a means to move or centralize the steadying rest relative to the work piece 17, the slide support having been fixed to the T-slot 21 of the compound rest 14 on the tool carriage. The feeding of the work against the tool bit may be effected, when one end of the work is retained wholly within the steadying rest, by turning back finger adjusting screw 57 or by turning the slide support screw 87.

Fixed to the upper edge of the slide support 83 is a clamping plate 88' that extends laterally and is inserted in the end of the T-slot 21 of the compound rest 14. This plate 88' is fixed to the upper edge of the slide support 83 by fastening bolts 89 and 89'. A top clamping plate 90 is extended over the clamping plate 88' and engages with the upper edges of the slot 21, as shown in Figs. 2 and 7, and is made secure by the tightening of a nut 91 and a bolt 92 that is countersunk in the bottom of plate 88' and projects upwardly therefrom. The ends of the plate 90 are shouldered so as to engage with the side edges of the slot 21 and prevent it from turning. Accordingly, the steadying rest can be fixed to the tool carriage and allowed thereby to travel therewith to steady the work piece 17 at all times while a cutting action is being effected with the cutting tool bit 18.

Referring now particularly to Figs. 9, 10, 11 and 12, there is shown a modified form of the invention where a separate adjusting shaft or screw is provided for each one of the work engaging fingers. A vertically extending plate 100 has at one side edge a recess 101 into which are extended adjustable work engaging fingers 102, 103 and 104 to engage with a rod stock piece 105. The plate 100 has on one side face and respectively above and below the recess 101 vertically aligned recesses or guide grooves 106 and 107 with which finger projections 102' and 103' of the respective fingers 102 and 103 cooperate to be guided in their vertically adjustable movement.

The upper finger 102 has a laterally extending arm 108 through which extends a short vertically extending adjusting shaft or screw 109 which is supported between bearing blocks 110 and 111. This adjusting screw has a turn knob 112 by which the screw can be turned to cause the vertical adjusting of the finger 102. Overlying the recess or guide groove 106 and forming a part of the bearing 110 is a retaining plate portion 113. The bearing 110 and the retaining plate portion 113 thereof are held in place by a plurality of fastening screws 114. A thumb screw 115 in the retaining portion 113 can be tightened to clamp and retain the finger 102 in it adjusted position. The clamping screw 115 is released before turning the adjusting screw 109.

The lower work engaging finger 103 is adjustable in the groove 107 and is held in place by a retaining plate 116 secured by screws 117 to the plate 100. The lower finger 103 has a laterally extending arm 118 with which a long adjusting shaft or screw 119 is connected. This adjusting shaft or screw 119 has a threaded portion 120 and a reduced end 121 that is journalled in a bearing bracket 122 secured to the side of the plate 100 by fastening screws 123. The upper portion of the shaft is journalled in the bearing 111 fixed to the upper end of the plate 100 and extends upwardly beyond the adjusting knob 112 to provide clearance for a larger adjusting knob 124. By turning the adjusting screw 119 the lower finger 103 is adjusted. A thumb screw 125 can be tightened upon the retaining plate 116 to lock or clamp the finger 103 in place upon the plate 100.

The back finger 104 lies on the opposite side of the plate 100 from the fingers 102 and 103. To guide this back finger 104 there is provided a horizontally extending groove 126 into which a projection 104' of the finger extends. The finger 104 is held in place on the back of the plate and within the groove by a retaining plate 127 and fastening screws 128.

The finger 104 has an upwardly extending portion 129 through which a horizontally adjusting shaft or screw 130 extends. This adjusting screw is journalled in bearing plates 131 and 132 secured to the respective opposite front and rear edges of the plate 100. A turn knob 133 is secured to the adjusting screw 130. When the adjusting screw is turned, the back finger 104 is moved toward or away from the work piece 105.

The vertically extending plate 100 has the slide support 83 which carries the clamping plates 88' and 90 for securing the rest of the T-slot of the compound tool rest 14 when it is desired to support the steadying rest upon the tool carriage. The adjusting screw 87, when the slide support is fixed to the T-slot of the carriage, will operate upon the vertical plate 100 to adjust the same relative to the support 83 and work in the manner as described above in connection with the first form of the invention. Also, this form of the invention may be provided as shown with the clamping attaching means for securing the rest to the lathe bed as above described. This clamping means includes depending clamping plate 67 with its portion 70, clamping plate 81 and clamping bolt 72. The head cups or caps 42 of soft metal can be provided on respective fingers.

It should now be apparent that there has been provided a steadying rest which can be either attached to the tool carriage or to the lathe bed and which has a vertically extending plate through which a work piece is extended and which carries adjustable upper and lower finger members and an adjustable back finger member, wherein all of the adjusting knobs are accessible to the operator of the lathe from the front of the rest and wherein the vertical support can be easily, quickly and accurately adjusted relative to the tool carriage toward and away from the work to accommodate the different size work pieces.

It should also be apparent that there has been provided according to the two forms of the invention adjusting shafts or screws which can adjust two of the finger members at one time or each finger independently of the other. It will also be apparent that the fingers can engage the work from the top, bottom or back, and thus leave the front open at all times to permit the easy insertion or removal of the work piece to thereby facilitate production.

While various changes may be made in the detail construction, it shall be understood that such changes shall be within the spirit and scope of the present invention as defined by the appended claim.

What is claimed is:

A steady rest comprising a relatively thick solid plate having one edge cutaway to form the plate into spaced arm plate sections joined by a central plate section, each arm section at one face of said plate having straight guideway grooves extending into the surface of said plate and extending toward each other and toward said cutaway, a finger support for each arm, each finger support having a surface slidable on the surface of said plate and a projection extending into said groove, means for each arm holding said arm in slidable relation to said plate, a pair of straight parallel guideway grooves extending into the surface of the central section of said plate at right angles to said first mentioned grooves and extending toward said cutaway, a finger support having a surface slidable on the surface of said plate and said last mentioned support being of L-shape construction and having a projection on each arm, each projection slidable in one of said grooves, means for retaining said last-mentioned support in slidable relation to said central plate section, a finger on each of said supports, said fingers lying in a common plane in said cutaway, and means for sliding said supports relative to said plate.

References Cited in the file of this patent

UNITED STATES PATENTS

| | | |
|---|---|---|
| 550,671 | Zeunert | Dec. 3, 1895 |
| 602,965 | Walker | Apr. 26, 1898 |
| 971,887 | Hanson | Oct. 4, 1910 |
| 1,523,310 | Sundstrand | Jan. 13, 1925 |
| 1,622,822 | Cockburn | Mar. 29, 1927 |
| 1,795,594 | Class | Mar. 10, 1931 |
| 1,815,490 | Bouillon | July 21, 1931 |
| 2,000,608 | Peaslee | May 7, 1935 |
| 2,390,888 | Liber | Dec. 11, 1945 |

FOREIGN PATENTS

| | | |
|---|---|---|
| 36,045 | Denmark | May 31, 1926 |
| 54,362 | Switzerland | Feb. 18, 1911 |